United States Patent [19]

McKee

[11] 4,238,128
[45] Dec. 9, 1980

[54] COMBINATION LOAD-LEVELING AND KNEELING AIR SUSPENSION SYSTEM

[75] Inventor: Laird W. McKee, Poway, Calif.

[73] Assignee: Grumman Flexible Corporation, Delaware, Ohio

[21] Appl. No.: 940,281

[22] Filed: Sep. 7, 1978

[51] Int. Cl.³ .............................................. B60G 21/00
[52] U.S. Cl. ................................ 280/703; 267/65 D; 280/6.1; 280/714; 280/DIG. 1
[58] Field of Search ............. 280/711, 714, 6 H, 6 R, 280/6.1, 5 R, DIG. 1, 703, 704, 712; 267/65 D

[56] References Cited
U.S. PATENT DOCUMENTS

| | | | |
|---|---|---|---|
| 3,063,734 | 11/1962 | Davies | 280/714 |
| 4,143,925 | 3/1979 | Young | 280/714 |

*Primary Examiner*—John J. Love
*Assistant Examiner*—Ross Weaver
*Attorney, Agent, or Firm*—Charles C. Logan, II

[57] ABSTRACT

A combination load-leveling and kneeling air suspension system for a vehicle having a sprung member and an unsprung member. The system has a pair of laterally spaced air springs, a pressurized air reservoir with a first tubing line connecting the pressurized air reservoir to the first laterally spaced air spring and a second tubing line connecting the pressurized air reservoir to the second laterally spaced air spring. The first tubing line and the second tubing line have a common tubing portion. A first valve member is located in the first tubing line but not in the common tubing portion. Likewise, a second valve member is located in the second tubing line but not in the common tubing line portion. A third tubing line is connected between the pair of laterally spaced air springs and an isolation valve is located in the third tubing line intermediate its ends. A fourth tubing line connects the isolation valve with the common tubing line portion. A leveling valve is located in the fourth tubing line intermediate its ends.

7 Claims, 3 Drawing Figures

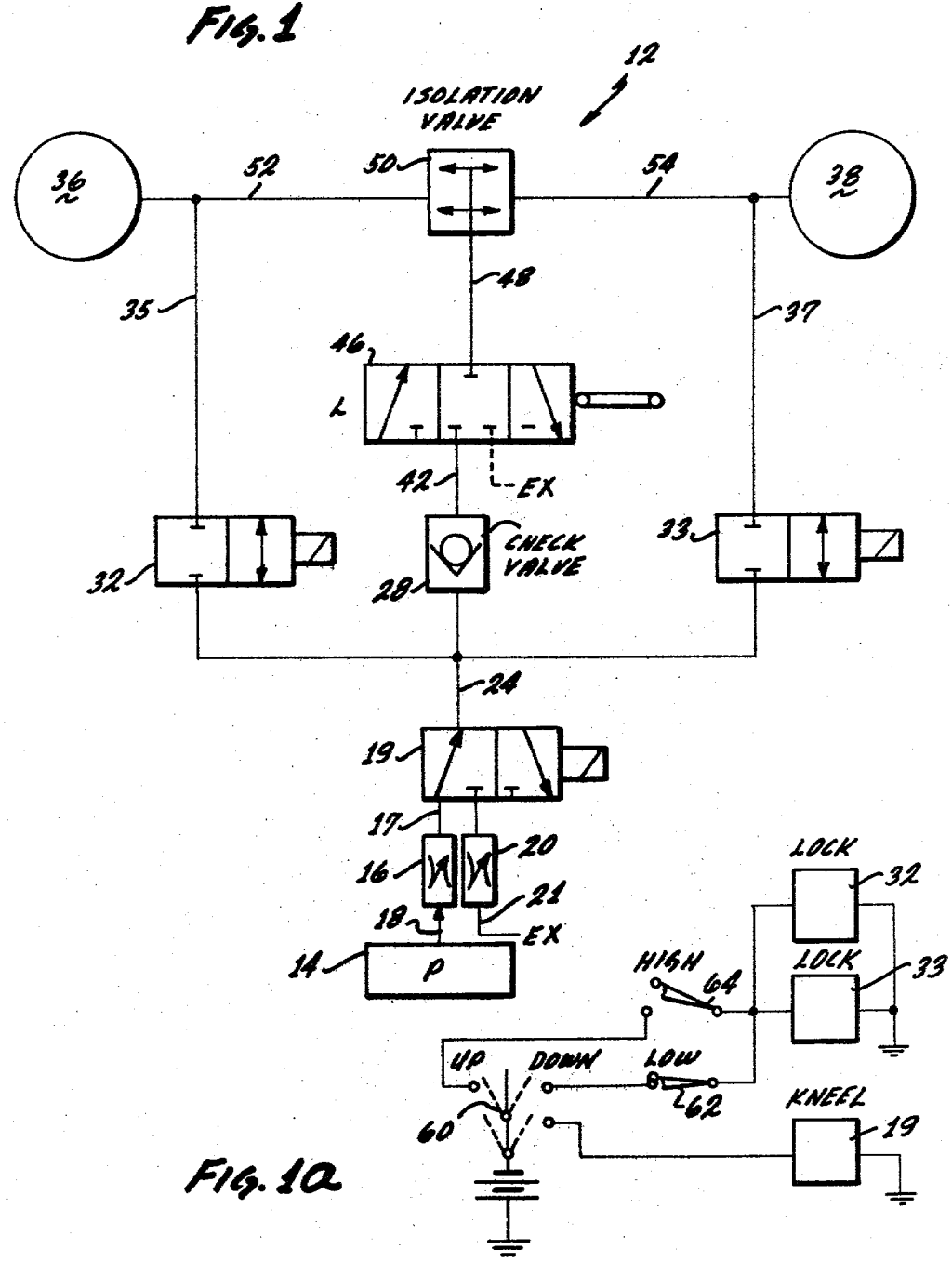

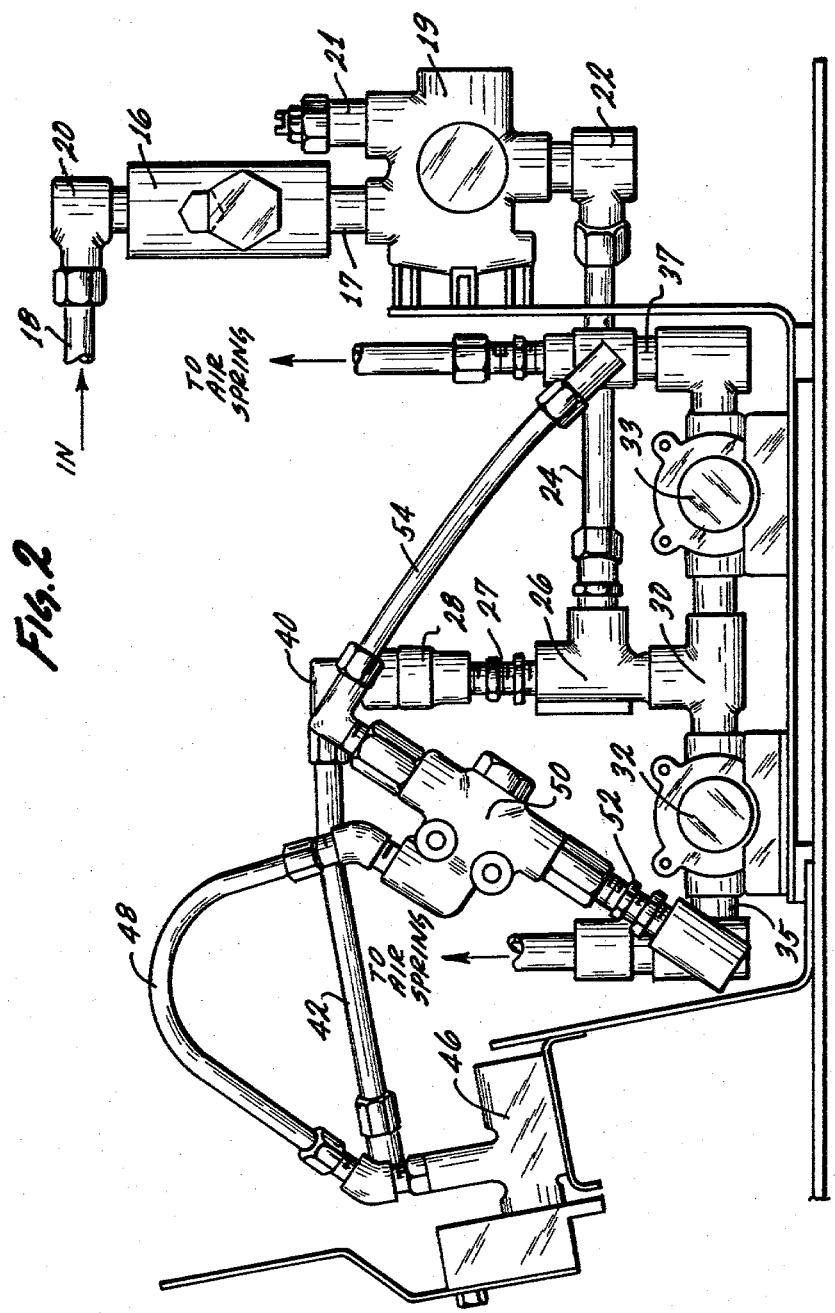

COMBINATION LOAD-LEVELING AND KNEELING AIR SUSPENSION SYSTEM

BACKGROUND OF THE INVENTION

The invention relates generally to an air suspension system for a motor vehicle and more particularly to an air suspension system having both a load-leveling capability and a kneeling capability.

In the past air suspension systems for motor vehicles incorporating a leveling mechanism automatically maintaining a predetermined relationship between the vehicle chassis and the road wheels have been well known. These air suspension systems are primarily designed around the load-leveling valve. Some of these load-leveling valves incorporate a safety feature so that the air in the air spring will be maintained even though a leak develops in another part of the system. An example of this type of an air suspension system is illustrated in U.S. Pat. No. 3,037,788.

One of the problems that has existed with air suspension systems having a single load-leveling valve to control both the front air springs of the vehicle has been that there was usually a common conduit between the two front air springs resulting in free fluid communication therebetween. In instances where there was a heavy impact on, for instance, the near-side spring would cause a surge of fluid into the off-side spring and any rolling tendancy of the vehicle due to the impact on the near-side was accentuated by a volumetric increase in the off-side spring and an uncontrollable or uncomfortable roll developed. In order to overcome this problem isolation valves were developed such as illustrated in U.S. Pat. No. 2,949,316.

In the past air suspension systems capable of kneeling the front end of a vehicle have been known. These air suspension systems however position the valves for kneeling the vehicle in series with the load-leveling valve of the air suspension systems and have not proven entirely satisfactory.

It is an object of the invention to provide a novel air suspension system for a vehicle having both a load-leveling capability and a front end kneeling capability.

It is also an object of the invention to provide a novel air suspension system for a vehicle having a load-leveling valve in a fluid circuit separate from that of the fluid circuit containing the front end kneeling valves.

It is also an object of the invention to provide a novel air suspension system for a vehicle having an isolation valve in series with a load-leveling valve in which the isolation valve is also in the fluid flow path between the laterally spaced front air springs of the vehicle.

It is another object of the invention to provide a novel air suspension system for a vehicle having a minimal number of valves in the system and having the valves of the most economical variety.

It is a further object of the invention to provide a novel air suspension system for a vehicle having the capability of varying the time required to kneel the front end of the vehicle and also to raise it up to a desired travelling height.

SUMMARY OF THE INVENTION

The novel air suspension system combines the load-leveling and kneeling capabilities for a vehicle having a sprung member and an unsprung member. The air suspension system has a pair of laterally spaced air springs for resiliently connecting the unsprung member to the sprung member at the front end of the vehicle. A first air passage line connects a pressurized air reservoir to the first laterally spaced air spring and a second air passage line connects the pressurized air reservoir to the second laterally spaced air spring. The first air line and the second air line have a common air line portion. A first valve member is located in the first air line but not in the common air line portion. This first valve member has a structure which in one position will shut off the flow of air through the valve member and structure which in a second position will allow air to pass therethrough in either direction. A second valve member is located in the second air line but not in the common air line portion. The second valve member also has structure which in one position will shut off the flow of air through the valve member and structure which in a second position will allow air to pass therethrough in either direction.

A third air line connects the pair of the laterally spaced air springs. An isolation valve is located in the third air line intermediate its ends. A fourth air line connects the isolation valve with the common air line portion. The isolation valve has structure which in one position functions to prevent the flow of air back and forth between the air springs and structure which in another position allows for the passage of air toward the air springs from the fourth air line or away from the air springs into the fourth air line.

A load-leveling valve is located in the fourth air line intermediate its ends. The load-leveling valve has structure which in a first position will shut off the flow of air through the valve, which in a second position the structure will allow air to pass therethrough in a direction toward the isolation valve and into both springs, and which is a third position will allow air to pass therethrough from the isolation valve and allow this air to be exhausted from both springs to atmosphere. A check valve is located between the load-leveling valve and the common air line position and it has structure which will allow air to only pass therethrough in a direction towards the leveling valve.

A third valve is located in the common air line portion and it has structure which in a first position will allow air to pass therethrough in a direction toward the air springs and which in a second position will allow air to pass therethrough in a reverse direction and allow it to be exhausted to atmosphere. A flow control valve is located in the common air line portion between the third valve and the pressurized air reservoir for adjusting the time required for the vehicle to be raised up from its front end kneeling position. A flow control valve is also connected to the exhaust outlet of the third valve for adjusting the time required to kneel the front end of the vehicle.

DESCRIPTION OF THE DRAWINGS

FIG. 1 is a schematic illustration of the novel combination load-leveling and kneeling air suspension system;

FIG. 1a is an electrical schematic illustrating how the novel combination load-leveling and kneeling air suspension system is operated; and FIG. 2 is a top plan view of the novel combination load-leveling and kneeling air suspension system.

DESCRIPTION OF THE PREFERRED EMBODIMENT

Referring now to FIGS. 1 and 2, the novel combination load-leveling and kneeling air suspension system for a vehicle will not be described. The air suspension system is generally designated numeral 12. The air suspension system has a pressurized air reservoir 14 connected to metering or flow control valve 16 through tubing 18 and elbow 20. Metering or flow control valve 16 is adjustable to vary the flow therethrough for varying the amount of time which is necessary to bring the vehicle back up to its traveling height after it has been lowered to its kneeling position.

After the air has passed through metering or flow control valve 16 it travels through nipple 17 into two way valve 19. Depending upon which position two way valve 19 is in, the pressurized air may be allowed to pass therethrough in a direction toward the air spring, or the air will be allowed to pass therethrough from the air spring and into exhaust metering or flow control valve 21. Metering or flow control valve 21 may be adjusted to vary the amount of time that passes during the kneeling operation of the front end of the vehicle when the air springs have the air exhausted therefrom.

Coupled to two-way valve 19 is an elbow 22, tubing 24, and a T-coupling 26. Extending from one end of T-coupling 26 is a nipple 27 that is connected to check valve 28. The other end of T-coupling 26 is connected to another T-coupling 30 whose opposite ends are connected to two-way valves 32 and 33 respectively. Tubing 35 connects two-way valve 32 to air spring 36 and tubing 37 connects two-way valve 33 to air spring 38.

Check valve 28 is connected through elbow 40 and tubing 42 to load-leveling valve 46. Load-leveling valve 46 is a three-way valve having a first position which will shut off the flow of air through the valve, a second position that will allow air to pass therethrough in a direction towards the isolation valve 50 and a third position which will allow air to pass therethrough from the isolation valve 50 and allow this air to be exhausted to atmosphere. Tubing 48 connects load-leveling valve 46 and isolation valve 50. The isolation valve 50 is in turn connected through tubing 52 and 54 to air springs 36 and 38 respectively.

Valves 19, 32 and 33 are solenoid controlled and their manner of operation can be understood by referring to FIG. 1a. A double throw toggle switch 60 when actuated to the down position will cause valves 32 and 33 to be moved to the position which allows the air to be exhausted from the air springs 36 and 38. At the same time valve 19 would be actuated to the position which will allow the air being exhausted from the air springs to pass through it and out through flow control valve 21. Microswitch 62 remains closed until the kneeling height for the front of the vehicle is reached at which time it will open which in turn causes valves 32 and 33 to be closed. When it is desired to raise the vehicle back up to its traveling height, the double throw toggle switch 60 is turned to the up position and valves 19, 32, and 33 will be operated to allow air to pass into air springs 36 and 38. When the vehicle has reached its proper travel height microswitch 64 will open thereby causing valves 32 and 33 to move to a position which will prevent a flow of air therethrough.

What is claimed is:

1. A combination load-leveling and kneeling air suspension system for a vehicle having a sprung member and an unsprung member comprising:
   a pair of laterally spaced air springs for resiliently connecting the unsprung member to the sprung member at the front end of the vehicle,
   a pressurized air reservoir,
   a first air passage means connecting said pressurized air reservoir to said first laterally spaced air spring and a second air passage means connecting said pressurized air reservoir to said second laterally spaced air spring, said first air passage means and said second air passage means having a common air passage portion,
   a first valve member located in said first air passage means but not in said common air passage portion, said first valve member having structure which in one position will shut off the flow of air through said valve member and structure which in another position will allow air to pass therethrough in either direction,
   a second valve member located in said second air passage means but not in said common air passage portion, said second valve member having structure which in one position will shut off the flow of air through said valve member and structure which is another position will allow air to pass therethrough in either direction,
   a third air passage means connecting said pair of laterally spaced air springs, isolation valve means are located in said third air passage means intermediate its ends,
   a fourth air passage means connecting said isolation valve means and said common air passage portion, and
   said isolation valve means having structure which in one position functions to prevent the flow of air back and forth between said air springs and structure which in another position allows for the passage of air toward said air springs from said fourth air passage means or away from said air springs into said fourth air passage means.

2. A combination load-leveling and kneeling air suspension system for a vehicle having a sprung member and an unsprung member comprising:
   a pair of laterally spaced air springs for resiliently connecting the unsprung member to the sprung member at the front end of the vehicle,
   a pressurized air reservoir,
   a first air passage means connecting said pressurized air reservoir to said first laterally spaced air spring and a second air passage means connecting said pressurized air reservoir to said second laterally spaced air spring, said first air passage means and said second air passage means having a common air passage portion,
   a first valve member located in said first air passage means but not in said common air passage portion, said first valve member having structure which in one position will shut off the flow of air through said valve member and structure which in another position will allow air to pass therethrough in either direction,
   a second valve member located in said second air passage means but not in said common air passage portion, said second valve member having structure which in one position will shut off the flow of air through said valve member and structure which is another position will allow air to pass therethrough in either direction, a third air passage means connecting said pair of laterally spaced air springs, isolation valve means are located in said third air passage means intermediate its ends, a fourth air passage means connecting said isolation valve means and said common air passage portion, said isolation valve means having structure which in one position functions to prevent the flow of air back and forth between said air springs and structure which in another position allows for the passage of air toward said air springs from said fourth air passage means or away from said air springs into said fourth air passage means, and load-leveling valve means located in said fourth air passage means intermediate its ends.

3. A combination load-leveling and kneeling air suspension system for a vehicle as recited in claim 2 wherein said load-leveling valve means has structure which in a first position will shut off the flow of air through the valve, which in a second position the structure will allow air to pass therethrough in a direction toward said isolation valve, and which in a third position will allow air to pass therethrough from said isolation valve and allows this air to be exhausted to atmosphere.

4. A combination load-leveling and kneeling air suspension system for a vehicle as recited in claim 2 further comprising a check valve located between said load-leveling valve and said common air passage portion and having structure which will allow air to only pass therethrough in a direction towards said leveling valve.

5. A combination load-leveling and kneeling air suspension system for a vehicle having a sprung member and an unsprung member comprising:

a pair of laterally spaced air springs for resiliently connecting the unsprung member to the sprung member at the front end of the vehicle, a pressurized air reservoir, a first air passage means connecting said pressurized air reservoir to said first laterally spaced air spring and a second air passage means connecting said pressurized air reservoir to said second laterally spaced air spring, said first air passage means and said second air passage means having a common air passage portion, a first valve member located in said first air passage means but not in said common air passage portion, said first valve member having structure which in one position will shut off the flow of air through said valve member and structure which in another position will allow air to pass therethrough in either direction, a second valve member located in said second air passage means but not in said common air passage portion, said second valve member having structure which in one position will shut off the flow of air through said valve member and structure which in another position will allow air to pass therethrough in either direction, a third air passage means connecting said pair of laterally spaced air springs, isolation valve means are located in said third air passage means intermediate its ends, a fourth air passage means connecting said isolation valve means and said common air passage portion, said isolation valve means having structure which in one position functions to prevent the flow of air back and forth between said air sproings and structure which in another position allows for the passage of air toward said air springs from said fourth air passage means or away from said air springs into said fourth air passage means, and a third valve and it is located in said common air passage portion and it has structure which in a first position will allow air to pass therethrough in a direction toward said air springs and which in second position will allow air to pass therethrough in a reverse direction and allows it to be exhausted to atmosphere.

6. A combination load-leveling and kneeling air suspension system for a vehicle as recited in claim 5 further comprising flow control valve means located in said common air passage portion between said third valve and said pressurized air reservoir for adjusting the time required for the vehicle to be raised up from its front end kneeling position.

7. A combination load-leveling and kneeling air suspension system for a vehicle as recited in claim 5 further comprising flow control valve means connected to the exhaust outlet of said third valve for adjusting the time required to kneel the front end of the vehicle.

* * * * *